Figure 1:
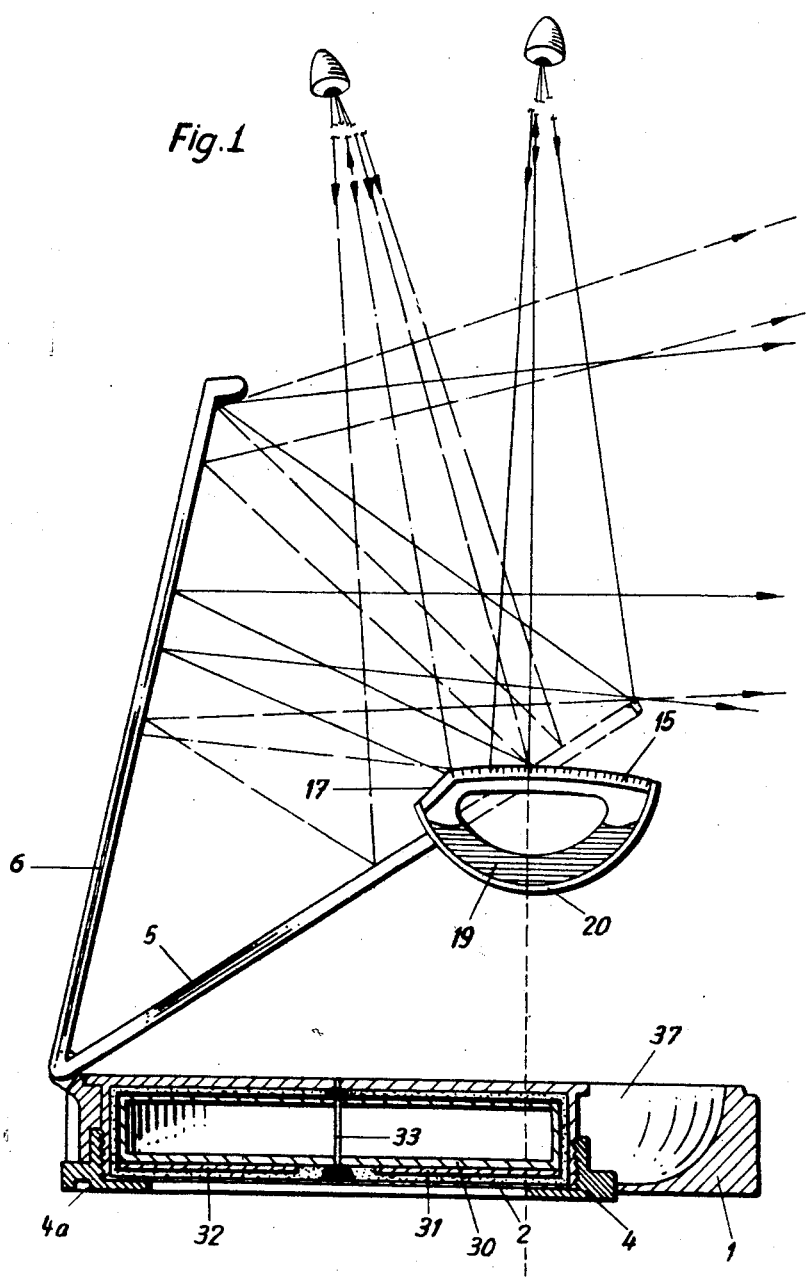

March 26, 1963  P. ZWEIFEL  3,082,663
MULTI-PURPOSE MAGNETIC POCKET COMPASS
Filed Feb. 2, 1960  4 Sheets-Sheet 2

INVENTOR
PETER ZWEIFEL
BY Lowry & Rinehart
ATTORNEYS

March 26, 1963  P. ZWEIFEL  3,082,663
MULTI-PURPOSE MAGNETIC POCKET COMPASS
Filed Feb. 2, 1960  4 Sheets-Sheet 3

INVENTOR
PETER ZWEIFEL
BY Lowry & Rinehart
ATTORNEYS

March 26, 1963 P. ZWEIFEL 3,082,663
MULTI-PURPOSE MAGNETIC POCKET COMPASS
Filed Feb. 2, 1960 4 Sheets-Sheet 4

INVENTOR
PETER ZWEIFEL
BY Lowry & Rinehart
ATTORNEYS

United States Patent Office 3,082,663
Patented Mar. 26, 1963

3,082,663
MULTI-PURPOSE MAGNETIC POCKET COMPASS
Peter Zweifel, Marbach, Switzerland
Filed Feb. 2, 1960, Ser. No. 6,175
4 Claims. (Cl. 88—2.3)

My present invention relates to improvements in multi-purpose magnetic pocket compasses, i.e. in a pocket instrument serving as compass, angle-measuring instrument, level and the like and comprising a rotatable first graduated circle, a second graduated circle oscillatable with a magnetic needle with respect to the first circle, an inclination pendulum, and a double-mirror sighting means or an alidade sighting means.

The main object of the invention is the provision of a pocket instrument which may be used, without any accessories, for the solution of various problems and as marching compass, geologist's compass, ship compass, angle-measuring instrument and level and the like, for which purpose different special instruments have been required so far.

Measuring instruments are known which comprise a transparent compass box and various forms of sighting and graduated-circle check means with one or two co-acting mirrors, and with plumb-line determination by means of a bob or a pendulum mirror.

The pocket instrument according to my present invention differs from the known means substantially by the fact that it comprises a compass box with a part which projects from the housing plate and which is provided with securing means, and with a further part which co-acts with said box and is rotatable about the center thereof and carries an alidade sight. Said further part allows, on one hand, of retaining and reading the azimuth values by angularly moving the sighting means on to the targets of the map and the landmarks of the terrain, and on the other hand of relating the targets and sections of the map to the landmarks and sections of the terrain by actuating the alidade.

By virtue of the coaction of an adhering means disposed on the transparent compass box with a sighting and graduated-circle check means fixed to a housing plate which comprises the compass box, new problems may be solved, the manipulation of the instrument, which has been simplified in all respects, and the use together with the map, the plans-table, any desired stationary base, or together with a rotary base such as in the case of a ship, no longer presenting any difficulties in solving these problems.

The instrument according to the invention further may be provided with known means for determining the plumb-line in order to render independent the measurements of the angles of inclination and the leveling operations from the incidental instrument support or, on the other hand, to determine the inclination of the support in the fall-line thereof.

As sighting device is used the double-mirror or alidade sighting means known per se, which is adapted to automatically click on to the rearward housing plate in alternative opening angles and is pivoted thereto and is provided with sighting lines. That mirror which is nearer to the compass box may be provided with an arcuate sight opening for the purpose of checking the two graduated circles.

Through sight through the compass box, which is necessary for the solution of certain problems, may be improved by providing as the magnetic needle a relatively thick magnetic bar which is discontinuous in the center of the compass box.

A box which is mounted on a relatively thin axle pin and which comprises the interior graduated circle, serves as carrier for said magnetic bar. Said box is held floating in an exterior compass box in a vibration-dampening liquid, the oscillating system having the same specific weight as said liquid, in order to dampen shocks on the bearing of the box-axle.

In the drawing is shown one form of the invention.

Figure 2:
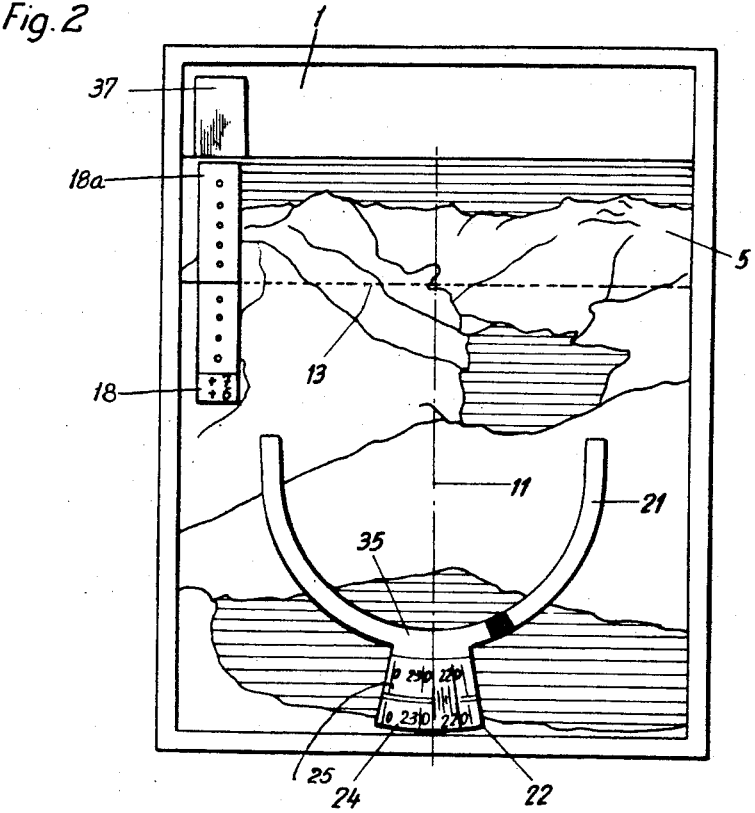
Figure 3:
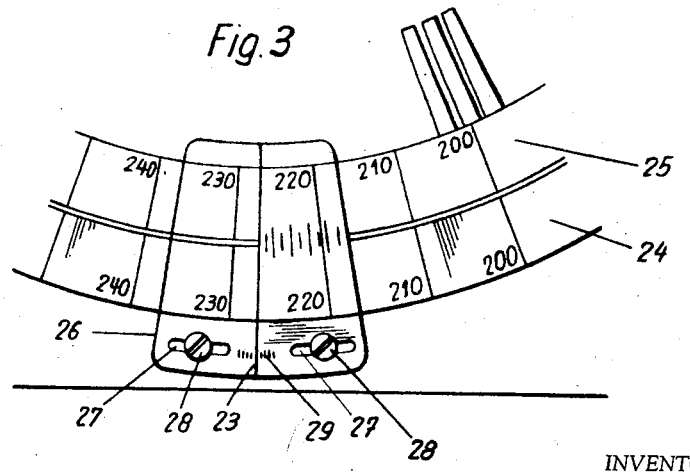
Figure 4:
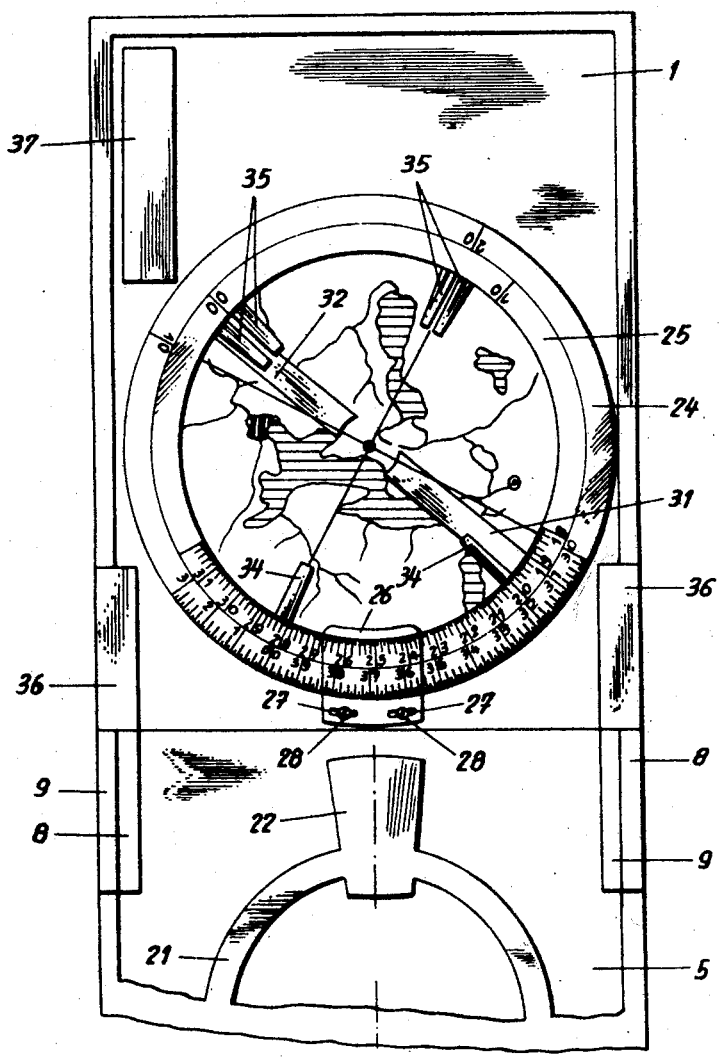
Figure 5:
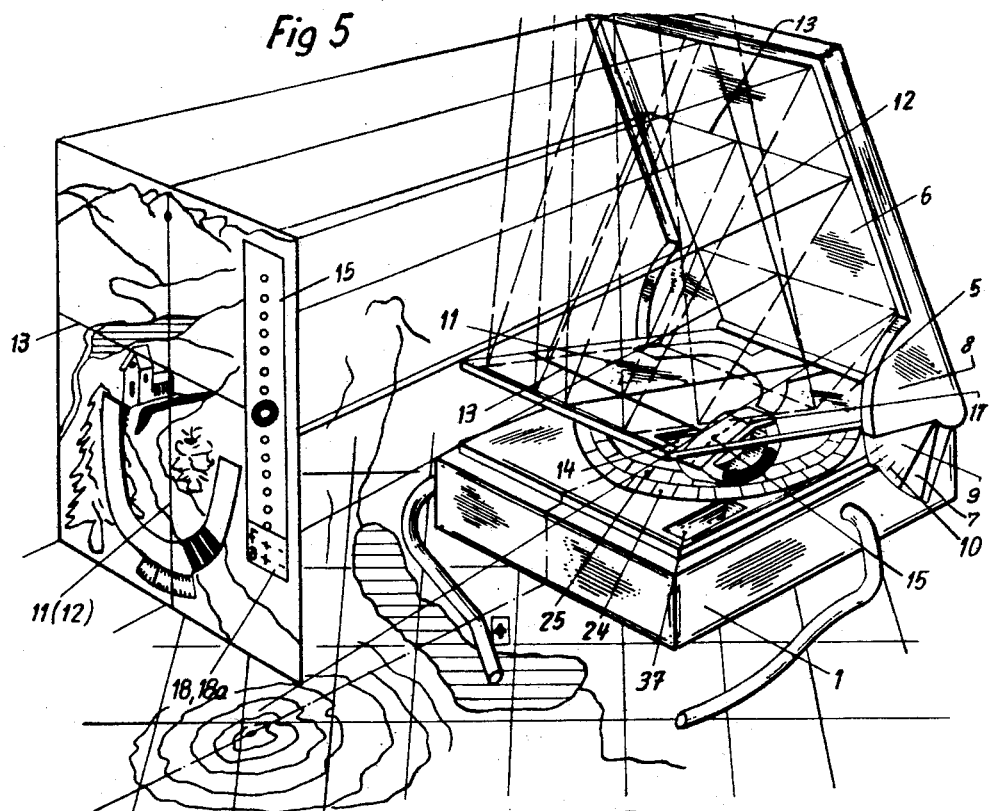
Figure 6:
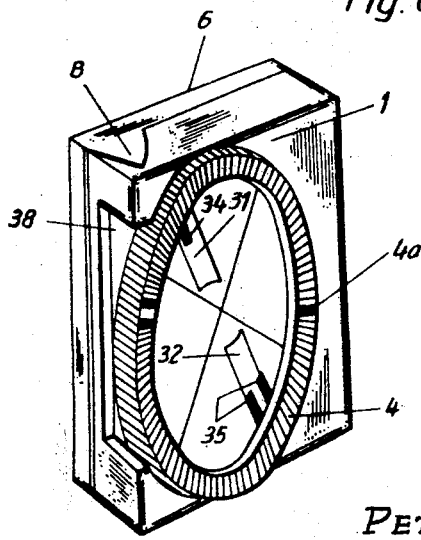

FIG. 1 is a cross-section through the instrument in its position for use, with the paths of the rays and the limits of the angular field drawn in, FIG. 2 is a top plan view of the instrument in its position for use, FIG. 3 shows a coincidence of the divided-circles with a changed embodiment of the divided-circle marking, FIG. 4 is a view through the instrument after the sighting device has been folded back, FIG. 5 is a diagrammatic representation of the instrument in the position for use, and FIG. 6 is a view of the bottom of the instrument.

The measuring instrument has a compass box 2 which is surrounded by a rectangular housing plate 1. An adjusting ring 4 secured to the bottom of the compass box 2 projects from the housing plate and is partially exposed through a recess 38 in the rear wall of the housing plate 1. The adjusting ring 4 is knurled at its edge and on its exposed underside to facilitate its manipulation and it is provided on its underside with indentations 4a which serve to fix the adjusting ring on its base. Pivotally attached to one top edge of the housing plate 1 are two mirrors 5 and 6, whose reflector surface face one another. The mirrors 5 and 6 can be locked by means of lateral clamping jaws 8 and 9 respectively which are held flush with the housing plate 1 by a recess 7. The clamping jaws 8 and 9 are provided with grooves 10 (FIG. 5) of varying depth and can be locked at certain angles of aperture in respect of each other and at certain clearances in respect of the housing plate 1. The mirror 5 has a sight line 11, and the mirror 6 a sight line 12. Said lines of sight 11 and 12 are preferably designed in two different colours in the form of rows of dots of different thickness produced in the longitudinal direction of the mirrors by, for instance, etching or the like, said rows of dots must be clearly visible even when the area surrounding the objective is not bright. Running across the mirror 5 is a horizon line 13 which, when viewed vertically from above and the mirrors 5 and 6 are set at an angle of 45° to each other, appears as the "horizon" in the double vertically reflected landscape image. For steeply rising or falling lines of sight the angle between the mirrors 5 and 6 is altered by a certain number of fine grooves, which results in the original direction of sight being raised or lowered by twice the value of the angle alteration.

The direction of sight, which is fixed for determining the angle of inclination, is orientated on a horizontally oscillating mirror 15 arranged in a recess 14 (FIG. 5) of the mirror 5, which mirror 15 in its horizontal rest position reflects the pupil of the sighting eye 16 vertically above its axis of rotation which coincides with the horizon line 13. By means of a curved scale, which corresponds to the radius of curvature of the curved mirror 15 and is marked with, by way of example, white dots, the deviation of the direction of sight from the horizontal can be read off, whereby the value of the angle of inclination measurement, which value is given by the engaged aperture angles of the mirrors 5 and 6, is finely subdivided.

The horizontally oscillating, strip-like, curved mirror 15 has an angled portion 17 which directs the vertical visual rays towards two scales 18, 18a which are arranged immediately adjacent to each other on the mirror 6 and of which one 18, at certain positions of the mirrors 5 and 6, indicates the inclination of the instrument in sections of an arc, while the other 18a indicates in lineal measures the height, related to the base of the housing plate, of the sight rays leaving the instrument. The first of these two scales is used for geological measurement, while the second is employed for the accurate determination of angles of inclination and for short-distance levellings, and it also facilitates simple and accurate checking of the instrument. For the oscillating mirror sections 15 and 17 oscillation damping is provided which consists of a curved lower part designed as a vessel 20 and filled with a damping liquid 19, the axis of rotation serving as the axis of curvature.

In the mirror 5 there is a semicircular sight hole 21 with a window 22 which serve to check the divided-circle settings and to take azimuth readings. A declination mark 23 is provided which consists of a line on a transparent plate 26, which line extends over two divided-circles 24 and 25 (FIG. 3). The plate 26 is movable owing to the presence of two sliding slots 27, it can be locked by means of set screws 28 and it can be set adjusted to the locally required declinations by means of a scale 29 located beneath the plate 26 and let into the housing plate 1.

The compass is formed by the compass box 2 which is provided with the divided-circle 24 and can be rotated by means of the adjusting ring 4. In the compass box 2 there is a braking fluid and another box 30 (FIG. 1). The divided-circle 25 is secured to the top of the box 30. The underside of said box 30 supports two bar magnets 31 and 32 which replace the magnetic needle. The weight of the closed, air-filled box 10 together with the divided-circle and the two bar magnets is so calculated that the box is kept floating in the damping fluid surrounding it, whereby the box 30 and the magnets do not exert any bearing pressure or have any impact effect on the shaft 33, and vertical torques which cause friction on the shaft or abrasion on the box cover are excluded.

The principal cardinal points are marked as follows: the north direction of the oscillating divided-circle 25 is indicated by a single line mark 34a and that of the rotating dial 24 by a double-line mark 35a. The south direction of the oscillating dial 25 is indicated by a single line-mark 34b and of the rotating dial 24 by a double line mark 35b. All the marks have the same radial length, are the same distance from the axis of rotation and, if the two divided-circles are in register, close up to form three adjacent marks each, three of these marks being visible in any position of the mirror 5 through the semicircle sight hole 21 (FIG. 2) so as to facilitate checking. The marks 34a, 34b, 35a, and 35b are preferably made in luminous paint.

When the instrument is not in use, the two mirrors 5 and 6 can be folded down on to the housing plate 1 and the mirror 6, which is then on top, can be locked to the housing plate by known locking means. When the mirrors are folded down, the clamping jaws 8 and 9 are accommodated flush with the housing plate 1 in recesses 36, while the oscillating member 15, 20 fits into a recess 37.

The measuring instrument according to the invention is manipulated as follows:

To enable the instrument to be used as a prismatic or orientation compass, the mirrors 5 and 6 are raised into the position for use according to FIG. 1. If the instrument is viewed approximately perpendicularly from above, a vertically reflected landscape image (FIG. 5) can be seen which contains the two lines of sight 11 and 12 which are brought into register. The instrument is then swivelled until the marks of the oscillating divided-circle 25 close up to those of the set divided-circle 24 to form a triple mark according to FIG. 2 or 3, which can be seen through the sight hole 21 of the lower mirror 5. If a new direction of march has to be established on the instrument, the latter is set at the new objective by actuating the adjusting ring 4, i.e. until the latter is in register with the oscillating divided-circle.

For exact measurements of angles of inclination, the instrument is placed on an at least approximately even, non-levelled base, then trained on the objective via the horizon line 13 and the direction of sight. The inclination angle is calculated with reference to the included angle between mirrors 5 and 6 and is read off the scale of the reflector surface 18a.

The azimuth of an objective on the topographic map is determined by holding the instrument, with the divided-circle 24 set at "North," against a coordinate line or a map fold, and then displacing it in parallel until the centre of the box is above the "Position" on the map, whereupon the instrument is swivelled until the lines of sight 11 and 12, which are in register, reach the "Objective" marked with the finger nail held vertically. The instrument can now be removed from the map and freely turned until the set divided-circle 24 is in register with the oscillating divided-circle 25, which is effected continuously during marching. It is, however, also possible to rotate the map with the instrument on it until the divided-circles 24 and 25 are in register. The objective on the map and that in the landscape are now in the same line of sight or are directly related to each other by tilting the one mirror. The converse procedure is applied when a point in the landscape has to be found on the map, the map point being sought along the base line visible on the map image. If a position has to be determined from two known landscape objectives, the lines of sight visible on the map are traced by hand while looking into the instrument.

If, besides one's own position, a point in the surrounding area can be assumed to be known, the instrument is trained on this point with the azimuth corresponding to this known objective, whereby the divided-circle set in accordance with the map comes into the geographically correct position, and said position is maintained by rotating the instrument on the base. This manipulation is used wherever a disturbance of the magnetic field has to be supposed.

Similarly the instrument is used to measure angles between points in the landscape independently of the magnetic needle. If necessary, the recesses 4a of the adjusting ring 4 can be slid over suitable projections of a fixed base, e.g. on a measuring table, boat or the like.

To determine the gradient of the base the instrument is placed on the base to be determined with the self-adjusting mirror positions "downwards" and the gradient of said base is read off by looking vertically down on to the horizon line 13 in the mirror 17.

Only one hand, possibly gloved, is required to operate the instrument. The vertical sighting range is very large, it being possible to measure some 60° of same to an accuracy of 1%. The divided-circle 24 can be freely readjusted during sighting without impairing the steadiness of the instrument. The determination of coincidence is obvious, extremely accurate and free from error. Sightings are made with the instrument resting on a support or from a steady base. For measurements of the angle of inclination the instrument can be placed on an unlevelled base and for levellings it can be advantageously set up on even ground, thus rendering the use of ranging rods superfluous in some cases. The azimuth is determined even on large size maps without an extension of the contact edge and without the map protractor considered necessary for exact measurements. Map objectives and objectives in the landscape are sighted in the same way and appear partly in the same visual field or are related to each other by swivelling one mirror; this is done reciprocally and continuously without raising the instrument from the map, without producing a coincidence, without turning an adjusting ring and without reading off an azimuth value. The landscape images are related as whole units to the map sections which correspond to them projectively and the details are identified by comparison. Angularly accurate sketches based on azimuth values, angles of inclination and map designations, as well as accurate panoramas can be drawn. The instrument, when used as a protractor and as an orientation instrument within the geographical directions, is largely independent of the compass needle, and it can thus be employed without restriction near iron, ore and in the neighbourhood of electricity lines. The horizon line is constantly contained in the reflected landscape image. The instrument is not impaired, as regards the accuracy of its functions, by oscillation, nor by being held at an oblique angle, and it can be used as a ship's compass on motor-boats and sailing ships, its direction being fixed by a mounting, while the sighting device can be swivelled, thus enabling the landscape objectives to be sighted at the lateral drift angles corresponding to the circumstances or the boat to be steered towards said objectives without the latter being seen; in addition, the instrument is always available for determining the azimuth on the map. The declination can be measurably adapted to the local conditions without touching the inside of the box. The instrument is simple in construction and extremely handy. The sighting accuracy is approximately 1%.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

This application is a continuation-in-part of my application Serial No. 600,628, filed July 27, 1956, now abandoned.

Having thus described my invention, I claim as new and desire to secure by Letters Patent:

1. A multi-purpose pocket compass comprising a housing plate, a transparent compass box mounted in said plate having a first graduated circle rotatable about a first axis normal to said plate, a second graduated circle mounted for rotation about said first axis and carrying a magnetic needle, a double-mirror system displaceably attached to said plate for movement about a second axis orthogonal to said first axis and overlying said compass box, said double-mirror system having upper and lower reflecting surfaces with sighting lines thereon and forming an alidade sight, said lower reflecting surface further having an aperture therein overlying said first and second graduated circles for reading azimuth values therefrom, and an inclination pendulum having a mirror surface with graduation markings thereon pivotally mounted on an edge of said lower reflecting surface for determining inclination values of said plate with respect to a horizontal reference marking carried by said upper reflecting surface.

2. A compass as set forth in claim 1 wherein said magnetic needle comprises bar segments secured to said second graduated circle in diametrically spaced relation with respect to the axis of rotation of said second graduated circle.

3. A compass as set forth in claim 1 wherein said double-mirror system and said housing plate include inter-engageable orienting portions for locating the double-mirror system in different angular relations with respect to said housing plate.

4. The structure of claim 1 including a housing upon which said housing plate is mounted, said housing including oscillation damping means therein operatively connected to said housing plate.

References Cited in the file of this patent
UNITED STATES PATENTS

| | | |
|---|---|---|
| 554,190 | Legh | Feb. 4, 1896 |
| 668,972 | Bruns | Feb. 26, 1901 |
| 790,163 | Verschoyle | May 16, 1905 |
| 1,446,574 | McAdie | Feb. 27, 1923 |
| 1,551,182 | Venetta | Aug. 25, 1925 |
| 2,111,829 | Winterer et al. | Mar. 22, 1938 |
| 2,407,416 | Grundmundson | Sept. 10, 1946 |
| 2,410,667 | Luboshez | Nov. 5, 1946 |
| 2,585,751 | Donnelly | Feb. 12, 1952 |

FOREIGN PATENTS

| | | |
|---|---|---|
| 504,783 | Germany | Aug. 9, 1930 |
| 6,514 | Great Britain | of 1896 |
| 20,272 | Great Britain | of 1909 |
| 11,000 | Great Britain | of 1910 |
| 25,091 | Great Britain | of 1912 |
| 339,768 | Great Britain | Dec. 18, 1930 |